(12) United States Patent
Larumbe Salinas

(10) Patent No.: US 6,389,737 B1
(45) Date of Patent: May 21, 2002

(54) FLOAT FOR FISHING ROD

(76) Inventor: Angel Larumbe Salinas, Avda. del Ferrocarril, 10 bis, 48012 Bilbao (Vizcaya) (ES)

( * ) Notice: Subject to any disclaimer, the term of this patent is extended or adjusted under 35 U.S.C. 154(b) by 0 days.

(21) Appl. No.: 09/644,243

(22) Filed: Jul. 11, 2000

(30) Foreign Application Priority Data

Jul. 12, 1999 (ES) .......................................... 9901844 U

(51) Int. Cl.[7] .............................................. A01K 95/00
(52) U.S. Cl. ...................................................... 43/44.87
(58) Field of Search ................................ 43/44.87, 44.9, 43/44.13, 44.91

(56) References Cited

U.S. PATENT DOCUMENTS

| | | | | |
|---|---|---|---|---|
| 668,254 A | * | 2/1901 | Dickinson | 43/44.9 |
| 2,512,002 A | * | 6/1950 | Wardrip | 43/44.87 |
| 2,531,806 A | * | 11/1950 | Coughlin | 43/44.91 |
| 3,096,599 A | * | 7/1963 | Baron | 43/44.9 |
| 3,303,598 A | * | 2/1967 | Spindler | 43/44.9 |
| 5,241,774 A | * | 9/1993 | Rayburn | 43/44.9 |
| 5,279,066 A | * | 1/1994 | Camera | 43/43.1 |

\* cited by examiner

*Primary Examiner*—Charles T. Jordan
(74) *Attorney, Agent, or Firm*—Katten Muchin Zavis Rosenman

(57) ABSTRACT

The float of the invention is constituted by a hollow ovoid body, completely closed but traversed longitudinally by a spindle, determining an assembly which floats in water and is inserted in an attachable/detachable manner in the fishing line, said spindle having at its extremities means for tying to the stiffening length of the fishing line joined to the end of the rod and to the length of fishing line corresponding to that which forms the line tail.

4 Claims, 2 Drawing Sheets

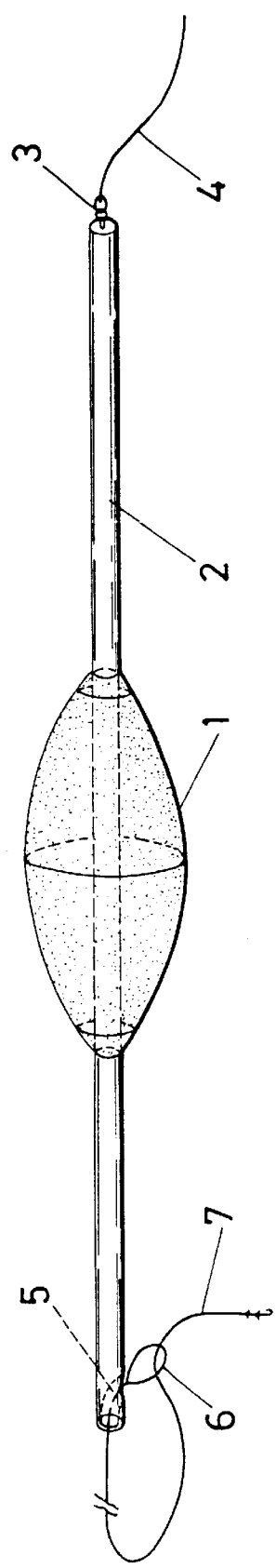
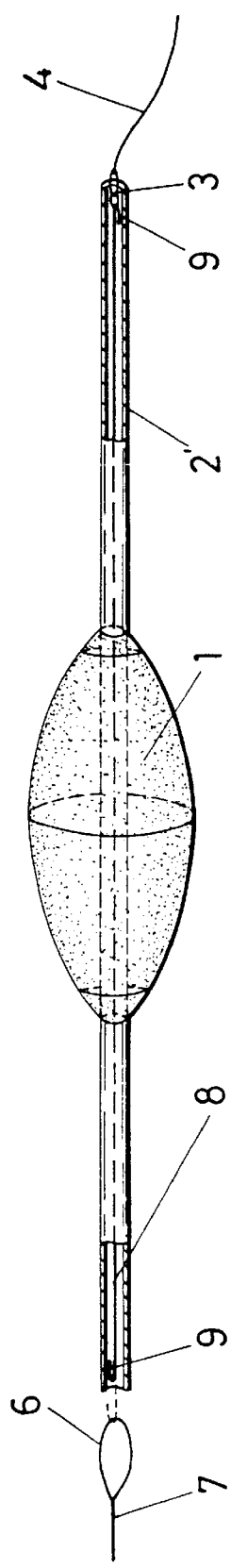

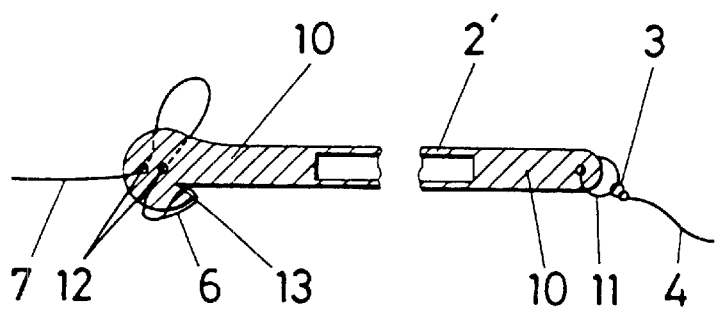
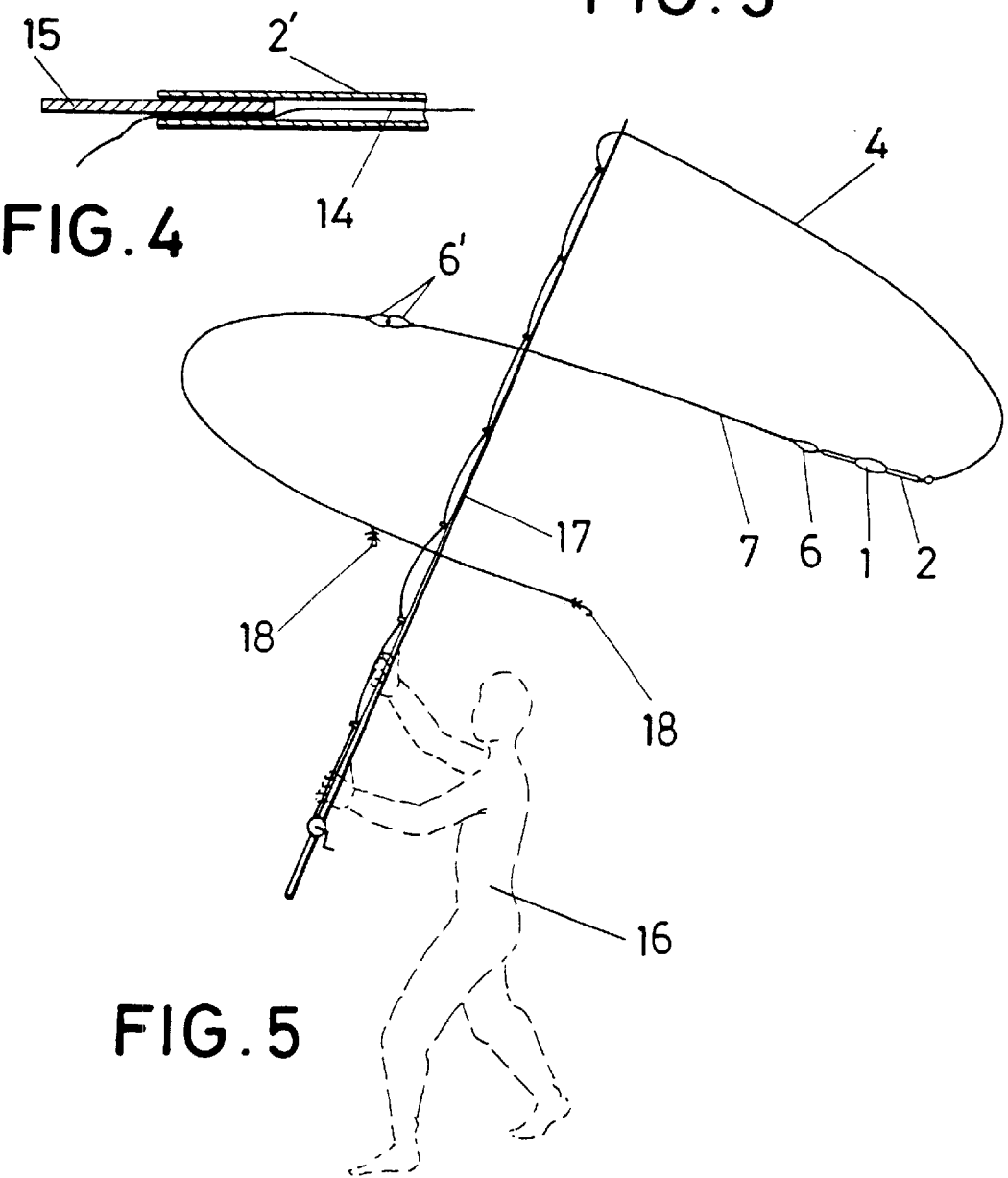

FLOAT FOR FISHING ROD

OBJECT OF THE INVENTION

The present invention relates to a fishing rod float, constituted by a hollow and ovoid body longitudinally traversed by a spindle determining an assembly which is inserted in a separable manner in the thread constituting the fishing line, so that when the latter is cast and falls in the water, the impact is absorbed as a consequence of the effect being shared between two parts (ovoid body and spindle), minimised by the lightness in weight and streamlined shape of the assembly.

The object of the invention is to make available to the angling community, a floating element which is inserted in the fishing line to achieve, in addition to the property stated above, the separation of the baits which can be incorporated on the length of line corresponding to the line tail and thereby reduce tangling, in addition to facilitating the recovery of the hook or hooks carrying the baits themselves.

The float is of application in that type of rod intended for fishing, both in the sea and in rivers and lakes, for fish such as trout, salmon, pike, etc.

BACKGROUND TO THE INVENTION

In rod fishing, when the line is cast over the water, an impact occurs which gives rise to a corresponding noise, frightening away any fish that could be in the area or nearby.

On the other hand, in those lines that carry various pieces of bait, tangling of the latter usually occurs, as well as getting caught up in brush, with the obvious inconvenience and problems that arise, from the nuisance caused to the angler in unravelling the tangle, to the time he wastes in doing this.

The applicant is also holder of the utility model 244.738 in which a device is claimed for the fishing of trout and similar, characterised by the fact that to the line reaching the rod are attached some plastic tubes which are closed at their ends with cork plugs, said plugs also performing the function of retention of the line that runs through the tubes. In this utility model it is also claimed that the tubes mentioned are capable of being joined to each other by means of an ovoid or spherical float, so that at the union of said tubes with the float, lead ballast rings are provided, all this so that on a basis of that idea, though not insofar as structural features are concerned, the float object of the present utility model has been developed, which includes a combination of the tube with the float having different characteristics and better properties.

DESCRIPTION OF THE INVENTION

The float proposed has been designed to overcome the problems expressed above and also provide new features and functions which result important from the point of view of efficacy in the angling process itself.

More specifically, the float of the invention is intended for inserting in the thread of the fishing line, being constituted by means of an ovoid and hollow body, completely closed but longitudinally traversed by a spindle, determining an assembly which floats in water, permitting the globate form to be laid on and lifted off the area of water with ease, by so controlling its weight which shall be in accord with the thickness of the line thread or the distance it is necessary to cast.

Said float is tied at one part to the length of stiffening thread that is joined to the end of the rod, said bond being formed preferentially by means of a turn suppressor to avoid the forming of kinks, coiling, etc., it therefore being possible to girate the spindle itself to dry the artificial flies fitted as bait and practice the greater art of dry fly fishing.

At the other extremity the spindle is tied to the other length of the fishing line thread, corresponding to that termed line tail, thereby permitting said length to be lifted with great ease, either for displaying the bait, or for trying new fishing ground with a single cast.

Both the spindle and the ovoid body shall preferably be transparent in nature, which together with their slight weight shall barely produce any appreciable noise or splashing, the float passing before fish with the greatest discretion.

In a preferred embodiment, the spindle is solid and the front extremity thereof, which is that which is tied to the corresponding length of line tail, has a centrally-located hole which projects at an angle towards one side, determining a passage for the tying of the respective end of said length of line. In this manner, it is possible for the knotting to be done quickly, which is one of the most important operations in angling.

This configuration makes it possible for the line tails to form an extension and over several metres of said tails be capable of obeying the movements of the rod, permitting all fishing methods to be practiced, both dry fly and wet fly, the artificial nymph or to use natural bait, both on the surface and in the bottom.

Nonetheless the spindle can be hollow and the line run through its inside, being trapped at the front extremity of the former by means of a stop in the form of a wedge which is inserted into said extremity by pressing, it being possible for said stop to be of wood, plastic or metal.

It is also possible that the spindle be hollow and include inside an axially-positioned metal wire, preferably of steel, with its two extremities bent back in hook form towards the inside, in order to tie to one of them a turn suppresser through which it is tied to the length of stiffener of the line joined to the rod, whilst to the hook at the other extremity is tied the other length of fishing line, i.e. that which forms the line tail.

It is also possible for the spindle in question to have its extremities flattened, in one of which two holes have been formed and a groove for the support, tying and placement of the length of fishing line corresponding to the line tail, whilst the other flattened extremity shall incorporate the respective turn suppresser to which is tied the stiffening length of the fishing line coming from the end of the rod.

In any case, the spindle always acts as a lever, separating the pieces of bait and thereby reducing the frequent and annoying tangling. In addition, the spindle makes it difficult for the fishing line to penetrate into areas of bows and branches when the line is cast, since it is generally the bar which is first to meet the foliage, reducing the tangling and facilitating the recovery of the hook or hooks.

It has also to be pointed out that when the line is cast and falls into the water, the impact is absorbed by virtue of the spindle being the first to enter the water, followed by the ovoid body, or else because said ovoid body is first, followed immediately by the spindle, the impact being shared between the two parts, said impact being minimised by the slight weight and streamlined shape of the float assembly.

DESCRIPTION OF THE DRAWINGS

To complete the description being made and facilitate a better understanding of the characteristics of the invention, in accordance with a preferred example of a practical embodiment thereof, a set of drawings is attached in which by way of illustration and not in a restrictive manner, the following are shown:

FIG. 1. Shows a schematic view according to a side elevation of the float of the invention in which the spindle is solid, on one of the extremities of which a very short tube is included with a knotting hole of the respective front length of fishing line or line tail and on the other extremity is included means for fastening a turn suppresser through which it is tied to the length of the stiffening thread coming from the end of the rod. The lower tube though short is of great importance, since the thread that extends therefrom, is under perfect control and cannot girate freely.

FIG. 2. Shows the float in which the spindle is hollow and on its inside is located a metal wire with its extremities hook-shaped for the tying of the lengths corresponding to the fishing line thread.

FIG. 3. Shows a detail of the extremities of the float spindle when said extremities are flattened and include the means for tying to the respective lengths of the fishing line thread.

FIG. 4. Shows another detail of the front extremity of the hollow spindle in which the fixing of the fishing line thread that runs through said spindle is done by means of an element that is inserted by way of a stop on said extremity of the spindle.

FIG. 5. Shows, finally, a practical application of the float of the invention inserted in the fishing line thread which extends from the end of a rod held by a person in outline.

PREFERRED EMBODIMENT OF THE INVENTION

As can be seen from the figures mentioned, the float of the invention is constituted from an ovoid and hollow body (1) sealed at both extremities and traversed longitudinally by a spindle (2), which can be solid as shown in FIG. 1 or hollow as explained below.

At the front end of this spindle (2) is mounted a turn suppresser (3), by one side fastened to the spindle (2) itself and by the other side tied to the pertinent stiffening thread (4) which is joined at its other extremity to the corresponding fishing rod, with the particularity that at the opposite extremity of the spindle (2) mentioned a centrally-positioned hole (5) is made which projects inwards and towards one side, determining a passage for the tying (6) of the corresponding length of fishing line thread which forms the line tail, length referred to with the number (7).

Said spindle, as is illustrated in FIGS. 2, 3 and 4, is hollow and is referred to in all these cases with the number (2'), so that in FIG. 2 said spindle (2') includes on the inside and able to move axially, a metal wire (8) having each of the extremities finished in a hook (9), so that the one corresponding to the rear extremity for the means for tying a turn suppresser (3) to which is joined or tied the stiffening length (4) corresponding to the fishing line thread coming from the rod, as stated before in relation with FIG. 1, whilst on the hook (9) corresponding to the front extremity of said spindle (2), is fastened the loop (6) of the length corresponding to the line tail (7).

In FIG. 3 the hollow spindle (2') is finished with each end having a flattened tip (10), so that the flattened tip (10) corresponding to the rear extremity has a hole through which passes a loop (11) for fastening the turn suppresser (3) to which is tied the stiffening length (4) referred to earlier, whilst in the flattened tip (10) of the opposite or front extremity of the spindle (2') two holes (12) and a groove (13) are practiced for passing and hitching the loop (6) corresponding to the length (7) that constitutes the line tail of the fishing line.

In FIG. 4, the spindle (2') forms the means through which passes the fishing line thread, being generally referred to in this case with the number (14) and which is retained at the forward extremity of said spindle (2') by means of a stop (15) constituted by an element in wedge form which is pushed into that extremity of the spindle (2'), pressing against the fishing line thread (14) and resulting in the latter being blocked and retained by said element (15) acting as stop, so that in this version it is possible to control the length of the fishing line thread (14) that extends from the actual float assembly, said length of line depending on the depth of the water or the wish of the angler.

Finally in FIG. 5, a practical application can be seen in which the outline (16) of an angler is in the casting position, by means of the corresponding rod (17), the fishing line, the latter including the pertinent float assembly formed by the ovoid body (1) and the spindle (2), or in the case (2') which traverses it, it being seen how said spindle (2) is tied at one of its extremities to the corresponding stiffening length (4) of the fishing line thread that is joined to the end of the rod (17), whilst at the other extremity and via the corresponding loop (6), it is tied to the length (7) of the line tails, it being possible to have these braided, of silk or plastic and capable of incorporating loops (6') joined to each other and determining different lengths to the ends of which are attached the corresponding pieces of bait (18), it being arranged that between the float in question and the corresponding rod (17) there can be various pieces of bait or flies, in those cases where there are no braided lines that are tied to the line tails via the loops (6') mentioned and shown in said FIG. 5.

This practical application described, has the bait after the mentioned float, characteristic of dry fly fishing. By combining with the nylon line, which can be on the last length to which the baits (18) are attached, it is linked on the (6') with the length (7) of the braided line which, in turn, is knotted to the turn suppresser (3), mounted on one extremity of the float (1).

Another practical application of this new float lies in that the pieces of bait are arranged between the rod (17) and the float (1) and in extension of the latter by using, for this case, nylon line.

What is claimed is:

1. Float for fishing rod, which being intended to have its application in angling for insectivorous fish, such as trout and salmon, both in the sea and in rivers and lakes, is characterized in that it is formed from a hollow ovoid body which is traversed longitudinally by a solid spindle, determining an assembly which floats in water and is inserted in an attachable/detachable manner in the fishing line thread, it having been provided for said spindle to have on its extremities means for tying to the stiffening length of the fishing line thread joined to the end of the rod, and to the length of the fishing line corresponding to that which forms the tail of the line and the means of tying the same to the length of reinforcing of the fishing line is fastened to a turn suppresser in order to avoid the forming of kinks, coiling and the like, while the other extremity has a centrally-located hole which extends inwards and has its exit on one side, determining the means of fastening by knotting a loop of the length of fishing line corresponding to the line tail.

2. Float for fishing line, in accordance with claim 1, characterised in that the spindle is hollow and includes inside an axially-positioned metal wire of steel or similar, with its two extremities finished in hook form towards the inside to fasten the turn suppresser through which it is joined to the stiffening length of fishing line coming from the rod, and for tying the length of fishing line thread corresponding to the line tail.

3. Float for fishing line, in accordance with claim 2, characterised in that the spindle has its ends flattened, in one of which two holes have been formed and a groove for the passing, tying and retention of the length of fishing line corresponding to the line tail, whilst the other flattened end has a hole through which passes a fastening or tying element of the turn suppresser through which the spindle is tied to the stiffening length of the fishing line joined to the rod.

4. Float for fishing line, in accordance with claim 2, characterised in that the fishing line thread is run through the spindle and is retained at the front extremity by means of a stop formed by an element having the shape of a wedge pressed into the respective extremity of the spindle.

* * * * *